(12) United States Patent
Cui et al.

(10) Patent No.: US 11,964,464 B2
(45) Date of Patent: Apr. 23, 2024

(54) TAPE, VEHICLE-MOUNTED DISPLAY MODULE AND VEHICLE-MOUNTED DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Dong Cui, Beijing (CN); Rui Han, Beijing (CN); Qing Ma, Beijing (CN); Zeyuan Tong, Beijing (CN); Zhipeng Zhang, Beijing (CN); Fengping Wang, Beijing (CN); Yue Zhai, Beijing (CN); Zan Zhang, Beijing (CN); Wenyang Li, Beijing (CN); Weining Chi, Beijing (CN); Rui Tan, Beijing (CN); Shouyang Leng, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 768 days.

(21) Appl. No.: 16/971,032

(22) PCT Filed: Oct. 29, 2019

(86) PCT No.: PCT/CN2019/113917
§ 371 (c)(1),
(2) Date: Aug. 19, 2020

(87) PCT Pub. No.: WO2021/081735
PCT Pub. Date: May 6, 2021

(65) Prior Publication Data
US 2021/0323273 A1   Oct. 21, 2021

(51) Int. Cl.
*B32B 7/14* (2006.01)
*B32B 37/12* (2006.01)
(Continued)

(52) U.S. Cl.
CPC ............... *B32B 7/14* (2013.01); *B32B 37/12* (2013.01); *B60K 35/00* (2013.01);
(Continued)

(58) Field of Classification Search
None
See application file for complete search history.

(56) References Cited

U.S. PATENT DOCUMENTS 10,091,869 B1 * 10/2018 Chien .................... H05K 3/321
2011/0234948 A1 * 9/2011 Yoon ..................... C09J 133/066
522/42

(Continued)

FOREIGN PATENT DOCUMENTS

CN     2745315 Y     12/2005
CN     203643704 U    6/2014
(Continued)

*Primary Examiner* — Anthony J Frost
(74) *Attorney, Agent, or Firm* — The Webb Law Firm

(57) ABSTRACT

A tape includes: a substrate, a conductive adhesive layer disposed on the substrate, and an insulating layer disposed on a part of a bonding surface of the conductive adhesive layer. The insulating layer is configured to insulate the conductive adhesive layer from a conducting part of an object to be bonded.

13 Claims, 4 Drawing Sheets

(51) Int. Cl.
    *B60K 35/00*     (2006.01)
    *B60K 35/22*     (2024.01)

(52) U.S. Cl.
    CPC ....... *B32B 2307/42* (2013.01); *B32B 2405/00* (2013.01); *B32B 2457/202* (2013.01); *B32B 2605/00* (2013.01); *B60K 35/22* (2024.01); *B60K 2360/1523* (2024.01); *B60K 2360/25* (2024.01)

(56) References Cited

U.S. PATENT DOCUMENTS

| | | | | |
|---|---|---|---|---|
| 2013/0063393 | A1* | 3/2013 | Kurishima | B32B 27/08 428/411.1 |
| 2013/0196129 | A1* | 8/2013 | Lee | C09J 9/02 428/212 |
| 2015/0004345 | A1* | 1/2015 | Chaung | C09J 5/06 428/189 |
| 2015/0248139 | A1* | 9/2015 | Kuroda | B32B 27/322 345/173 |
| 2015/0253484 | A1* | 9/2015 | Araki | G02B 6/0091 362/609 |

FOREIGN PATENT DOCUMENTS

| | | |
|---|---|---|
| CN | 203746040 U | 7/2014 |
| CN | 205347315 U | 6/2016 |
| CN | 208672978 U | 3/2019 |
| CN | 208689316 U | 4/2019 |
| JP | 2012-226212 A | 11/2012 |
| KR | 101333384 B1 | 11/2013 |

\* cited by examiner

TAPE, VEHICLE-MOUNTED DISPLAY MODULE AND VEHICLE-MOUNTED DISPLAY DEVICE

CROSS-REFERENCE TO RELATED APPLICATION

This application is a national phase entry under 35 USC 371 of International Patent Application No. PCT/CN2019/113917 filed on Oct. 29, 2019, which is incorporated herein by reference in its entirety.

TECHNICAL FIELD

The present disclosure relates to the field of display technologies, and in particular, to a tape, a vehicle-mounted display module and a vehicle-mounted display device.

BACKGROUND

In a small-sized liquid crystal display device, for example, in a vehicle-mounted liquid crystal display device, a cell tape is usually used to bond a back light unit (BLU) and a display panel together, so as to achieve lightness and thinness of the liquid crystal display device.

SUMMARY

In one aspect, a tape is provided. The tape includes: a substrate, a conductive adhesive layer disposed on the substrate, and an insulating layer disposed on a part of a bonding surface of the conductive adhesive layer. The insulating layer is configured to insulate the conductive adhesive layer from a conducting part of an object to be bonded.

In some embodiments, the insulating layer has a single-layer structure. The insulating layer includes an insulating adhesive layer or an insulating resin layer.

In some other embodiments, the insulating layer has a multi-layer structure. The insulating layer includes: at least one insulating resin layer stacked along a direction of the conductive adhesive layer facing away from the substrate, and an insulating adhesive layer located on a surface of the at least one insulating resin layer facing away from the substrate.

In some embodiments, an orthographic projection of the insulating layer on the substrate is within an orthographic projection of the conductive adhesive layer on the substrate, and at least a part of an outer contour of the orthographic projection of the insulating layer on the substrate and an outer contour of the orthographic projection of the conductive adhesive layer on the substrate have a space therebetween.

In some embodiments, a thickness of the insulating layer ranges from 0.001 mm to 0.030 mm. The thickness of the insulating layer is a dimension thereof along a direction facing away from the conductive adhesive layer.

In some embodiments, the substrate is a light-shielding substrate.

In some other embodiments, the conductive adhesive layer is a light-shielding conductive adhesive layer.

In some other embodiments, the tape further includes a light-shielding layer disposed between the substrate and the conductive adhesive layer.

In another aspect, a vehicle-mounted display module is provided. The vehicle-mounted display module includes: a display panel, a plastic frame bearing the display panel, and a tape bonding the display panel and the plastic frame, as described in some embodiments above.

In some embodiments, the display panel includes: an array substrate, a color filter substrate, and a conducting part located on a part of the array substrate that is not covered by the color filter substrate. An orthographic projection of the conducting part on the array substrate is within an orthographic projection of the insulating layer in the tape on the array substrate.

In some other embodiments, the display panel includes: an array substrate, a color filter substrate, a conducting part located on a part of the array substrate that is not covered by the color filter substrate, and an overcoat coating on the conducting part. The overcoat is configured to protect a conductive performance of the conducting part. An orthographic projection of a part of the conducting part that is not covered by the overcoat on the array substrate is within an orthographic projection of the insulating layer in the tape on the array substrate.

In some embodiments, the overcoat is an ultraviolet ray adhesive layer or a room temperature vulcanized silicone rubber layer.

In some embodiments, the conducting part includes signal lines or line detection points.

In some embodiments, the display panel further includes; a first polarizer disposed on a side of the color filter substrate facing away from the array substrate. A part of the color filter substrate that is not covered by the first polarizer is bonded to the tape, and a thickness of the tape is less than or equal to a thickness of the first polarizer. The thickness of the tape and the thickness of the first polarizer are their dimensions along a direction facing away from the color filter substrate respectively.

In some embodiments, the vehicle-mounted display module further includes a back light module disposed at a side of the plastic frame facing away from the display panel. The tape further bonds the back light module.

In some embodiments, the vehicle-mounted display module further includes; a screen driving plate, a flexible printed circuit, and a connector. The flexible printed circuit is electrically connected to the display panel. The connector is electrically connected to the screen driving plate and the flexible printed circuit. The tape also bonds the screen driving plate, and an orthographic projection of the connector on the tape is within a region where the insulating layer in the tape is located.

In yet another aspect, a vehicle-mounted display device is provided. The vehicle-mounted display device includes the vehicle-mounted display module as described in some embodiments above.

BRIEF DESCRIPTION OF THE DRAWINGS

In order to describe technical solutions in some embodiments of the present disclosure more clearly, the accompanying drawings to be used in some embodiments of the present disclosure will be introduced briefly. Obviously, the accompanying drawings to be described below are merely accompanying drawings of some embodiments of the present disclosure, and a person of ordinary skill in the art can obtain other drawings according to these drawings.

DETAILED DESCRIPTION

The technical solutions in embodiments of the present disclosure will be described clearly and completely in combination with the accompanying drawings in some embodiments of the present disclosure. Obviously, the described embodiments are merely some but not all of the embodiments of the present disclosure. All other embodiments made on the basis of the embodiments of the present disclosure by a person of ordinary skill in the art shall be included in the protection scope of the present disclosure.

A small-sized liquid crystal display device, for example, a vehicle-mounted liquid crystal display device, is usually provided with a display module.

Figure 1:
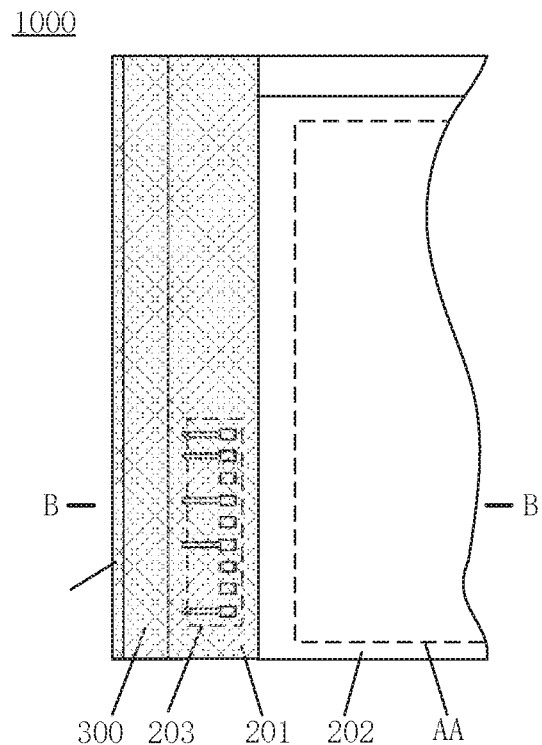
FIG. 1 is a partially schematic diagram of a vehicle-mounted display module, in accordance with some embodiments of the present disclosure.

Some embodiments of the present disclosure provide a vehicle-mounted display module. Please refer to FIGS. 1 to 3, a display module 1000 includes a display panel 200, a plastic frame 300, and a tape 100 (Cell Tape) configured to bond the display panel 200 to the plastic frame 300.

The display panel 200 usually has a display area AA and a non-display area located at the periphery of the display area. The display panel 200 includes an array substrate 201 and a color filter substrate 202 disposed on the array substrate 201. In a case where the display panel 200 is a liquid crystal display panel, liquid crystal is disposed between the array substrate 201 and the color filter substrate 202. In addition, there is a step between an edge of at least one side of the array substrate 201 and a corresponding edge of the color filter substrate 202. That is, a region of the array substrate 201 is not covered by the color filter substrate 202. The region at least includes at least one of a detection region or a signal line bonding region (such as a PAD region), so as to be configured to connect a screen detection device, a driving integrated circuit (IC), a screen driving plate, or the like. That is, a conducting part 203 in the display panel 200 is usually disposed in this region, and the conducting part 203 includes at least one conductive element, such as signal lines or line detection points. In addition, the conducting part 203 as a component of the array substrate 201 can be manufactured together with pixel driving circuits in the array substrate 201 during a manufacturing process of the array substrate 201.

After mounted in a vehicle such as an automobile, the vehicle-mounted display module 1000 is prone to vibrate due to the waggle or jolt of the vehicle during traveling, so that the vehicle-mounted display module 1000 needs to have particularly high vibration reliability. Therefore, in a production process of the vehicle-mounted display module 1000, a vibration reliability test is performed on the vehicle-mounted display module 1000, which can ensure using reliability of the vehicle-mounted display module 1000 after it is mounted in the vehicle.

However, in a process of performing the vibration reliability test to the vehicle-mounted display module 1000, the plastic frame 300 is easily deformed by force, and the display panel 200 is prone to move relative to the plastic frame 300 along a direction perpendicular to a display surface. As a result, the tape 100 is in contact with the conducting part 203 of the display panel 200. The tape 100 for bonding the display panel 200 and the plastic frame 300 is generally conductive, therefore, once the tape 100 is in contact with the conducting part 203 of the display panel 200, a part of circuits in the display panel 200 may be short-circuited, which in turn causes poor display of the display panel 200. On this basis, some embodiments of the present disclosure provide a tape 100 to be applied to the vehicle-mounted display module 1000. Please refer to FIG. 6, the tape 100 includes a substrate 101, a conductive adhesive layer 102 disposed on the substrate 101, and an insulating layer 103 disposed on a part of a bonding surface of the conductive adhesive layer 102. The insulating layer 103 is configured to insulate the conductive adhesive layer 102 from a conducting part 203 in an object to be bonded.

Herein, for example, the object to be bonded is the display panel 200 in the vehicle-mounted display module 1000. The conducting part 203 in the display panel 200 is located in the region of the array substrate 201 that is not covered by the color filter substrate 202. The conducting part 203 includes signal lines, line detection points, or the like.

After the display panel 200 is bonded to the corresponding plastic frame 300 by the tape 100, the electro-static discharge (ESD) resistance of the display panel 200 (i.e., the corresponding vehicle-mounted display module 1000) may be effectively improved by using the conductive adhesive layer 102 provided in the tape 100.

In some embodiments of the present disclosure, the insulating layer 103 is disposed on a part of the bonding surface of the conductive adhesive layer 102. On the basis that the conductive adhesive layer 102 may effectively bond the display panel 200, the insulating layer 103 may effectively insulate the conductive adhesive layer 102 from the conducting part 203 in the display panel 200.

Figure 2:
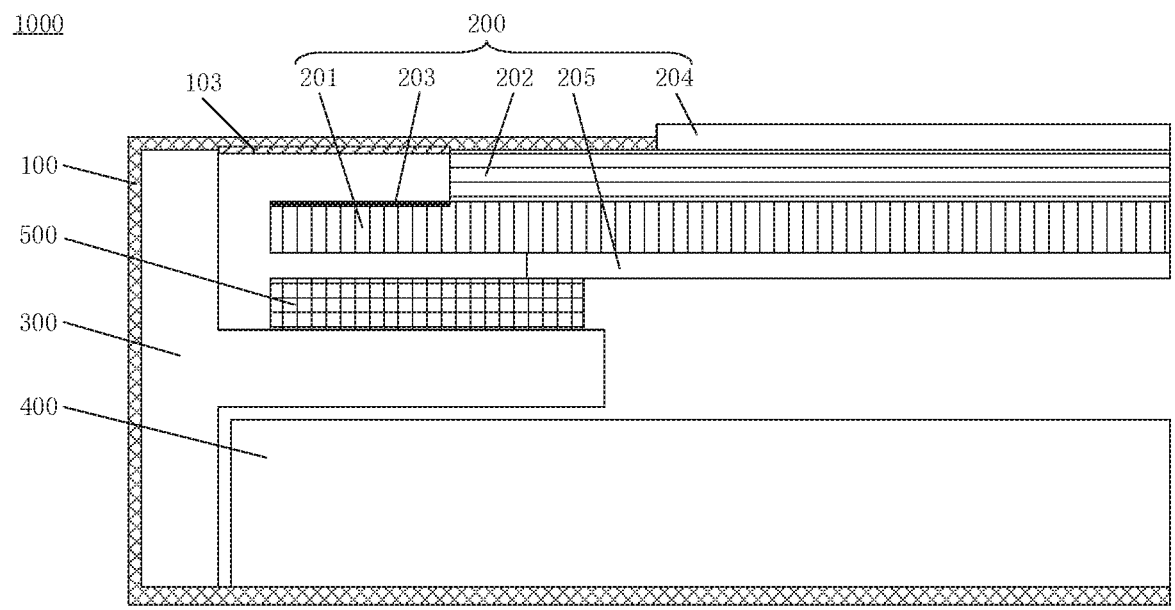
FIG. 2 is a schematic cross-sectional diagram of the vehicle-mounted display module in a B-B direction shown in FIG. 1.
Figure 4:
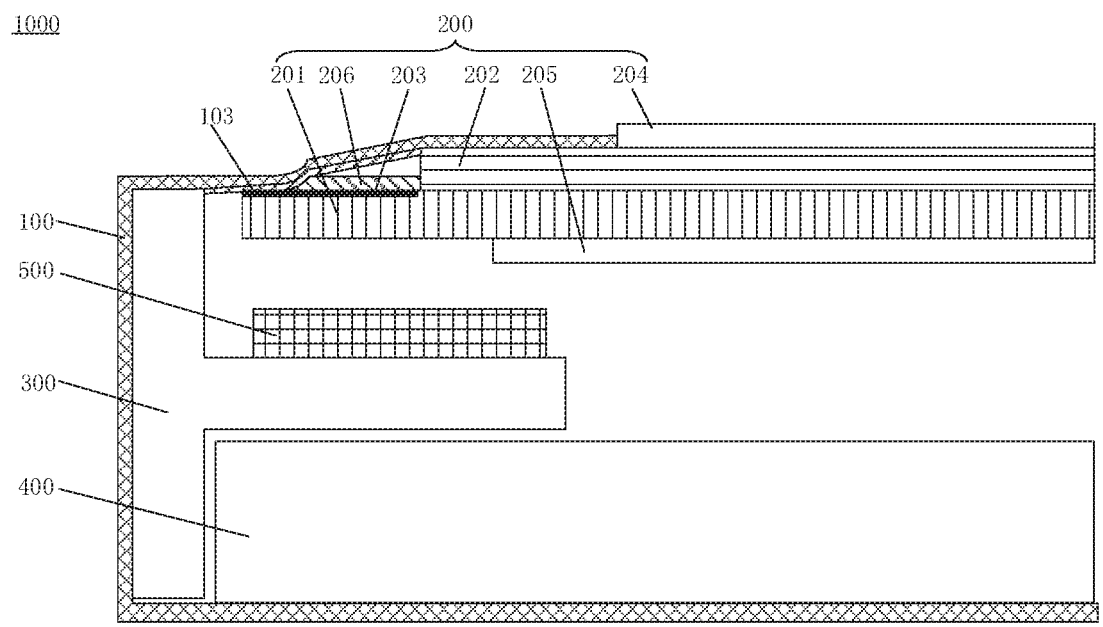
FIG. 4 is a schematic diagram showing contact between a tape and a conducting part, in accordance with some embodiments of the present disclosure.

Specifically, as shown in FIG. 2, the tape 100 is usually in a tight state after bonding the display panel 200 and the plastic frame 300, There is a certain space between an inner surface of the tape 100 (i.e., a surface thereof facing the display panel 200) and the conducting part 203 of the display panel 200, and the tape 100 can be insulated from the conducting part 203 by air. In some embodiments of the present disclosure, the insulating layer 103 is disposed on a part of the bonding surface of the conductive adhesive layer 102. During long-term use of the vehicle-mounted display module 1000 or during the reliability test thereof, as shown in FIG. 4, though the plastic frame 300 in the vehicle-mounted display module 1000 is deformed, or the display panel 200 moves relative to the plastic frame 300 along the direction perpendicular to the display surface, and then the inner surface of the tape 100 is in direct contact with the conducting part 203 in the display panel 200, the insulating layer 103 in the tape 100 is in direct contact with the conducting part 203, thereby preventing the conductive adhesive layer 102 in the tape 100 from being in contact with the conducting part 203; the contact may lead to a short circuit problem in the vehicle-mounted display module 1000.

In addition, in some embodiments of the present disclosure, the tape 100 has light-shielding performance. That is, at least one layer of the tape 100 may block light, thereby preventing light from leaking from a side through the vehicle-mounted display module 1000 adhered thereto.

In some examples, the substrate 101 in the tape 100 is a light-shielding substrate. That is, the substrate 101 is made of a material that is opaque or has a light transmittance less than or equal to 10%, such as black polyimide.

In some other examples, the conductive adhesive layer 102 in the tape 100 is a light-shielding conductive adhesive layer. That is, the conductive adhesive layer 102 is made of conductive glue that is opaque or has a light transmittance less than or equal to 10%, for example, black conductive glue.

In some other examples, both the substrate 101 and the conductive adhesive layer 102 in the tape 100 are transparent. Please refer to FIG. 7, the tape 100 further includes a light-shielding layer 104 disposed between the substrate 101 and the conductive adhesive layer 102. The light-shielding layer 104 is made of a material that is opaque or has a light transmittance less than or equal to 10%, for example, black ink.

Figure 7:
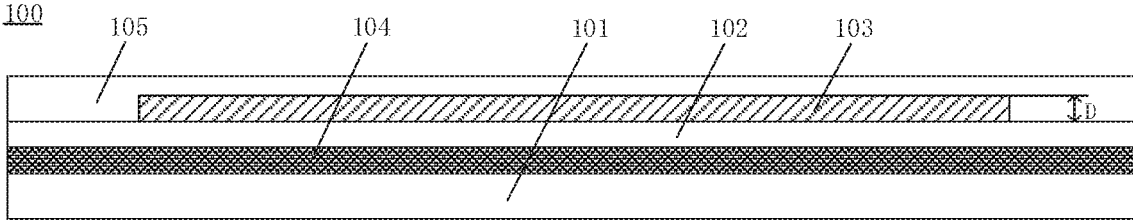
FIG. 7 is a schematic diagram of another tape, in accordance with some embodiments of the present disclosure.

In some embodiments of the present disclosure, as shown in FIG. 7, the tape 100 further includes a release film 105. The release film 105 is disposed on a surface of the insulating layer 103 facing away from the conductive adhesive layer 102, and on a surface of the conductive adhesive layer 102 that is not covered by the insulating layer 103. In a state in which the tape 100 is not being used, the release film 105 can protect the conductive adhesive layer 102 and the insulating layer 103. When the tape 100 is being used, the release film 105 can be removed.

The insulating layer 103 in the tape 100 is made of an insulating material, and the insulating layer 103 may have a single-layer structure or a multi-layer structure. Both designs are possible.

Figure 6:
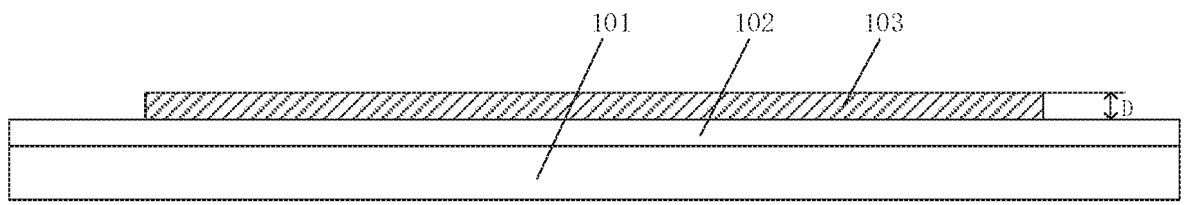
FIG. 6 is a schematic diagram of a tape, in accordance with some embodiments of the present disclosure.

In some examples, as shown in FIG. 6, the insulating layer 103 has a single-layer structure, and the insulating layer 103 is an insulating adhesive layer or an insulating resin layer. That is, the insulating layer 103 is made of one of the insulating glue or insulating resin. For example, the insulating layer 103 is formed by a coating process, which is easy to operate and is convenient to manufacture the same.

In addition, optionally, the insulating glue is acrylic glue. The insulating resin is polyethylene terephthalate (PET) or polybutylene terephthalate (PBT).

Figure 11:
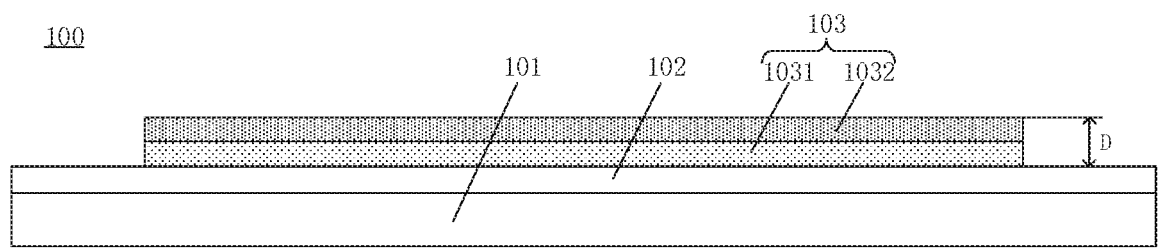
FIG. 11 is a schematic diagram of yet another tape, in accordance with some embodiments of the present disclosure.

In some other examples, as shown in FIG. 11, the insulating layer 103 has a multi-layer structure. The insulating layer 103 includes: at least one insulating resin layer 1031 stacked along a direction facing away from the substrate 101, and an insulating adhesive layer 1032 located on a surface of at least one insulating resin layer 1031 facing away from the substrate 101. That is, the insulating layer 103 is made of insulating resin and insulating glue, and the insulating adhesive layer 1032 made of insulating glue covers the insulating resin layer 1031.

In some embodiments of the present disclosure, the insulating layer 103 is provided with the insulating adhesive layer 1032, which may ensure the overall adhesive strength and an adhesive effect of the tape 100 on the premise of ensuring an insulating effect of the insulating layer 103.

Figure 8:
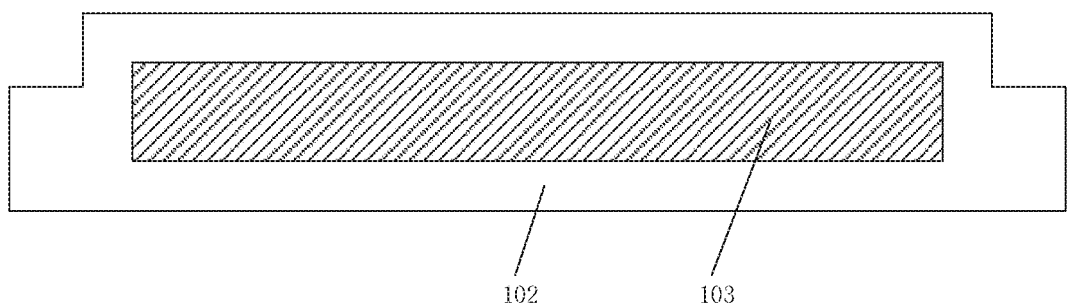
FIG. 8 is a schematic top view of the tape shown in FIG. 6.
Figure 9:
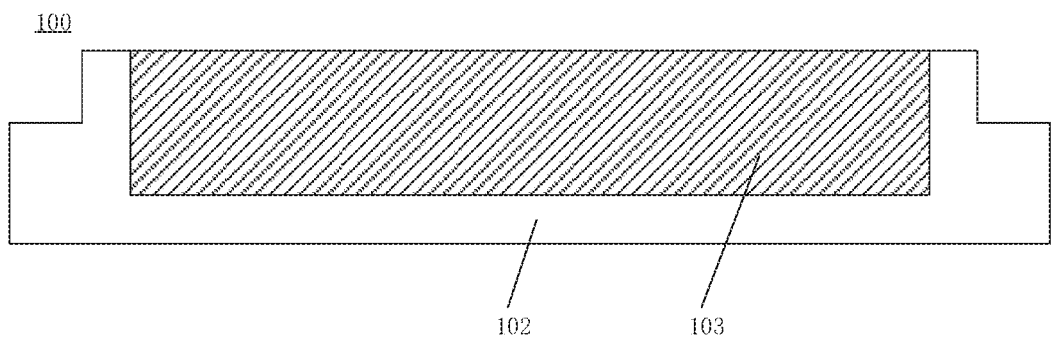
FIG. 9 is a schematic top view of another tape shown in FIG. 6.

In some embodiments of the present disclosure, referring to FIGS. 8 and 9, an orthographic projection of the insulating layer 103 on the substrate 101 is within an orthographic projection of the conductive adhesive layer 102 on the substrate 101, and there is a space between at least a part of an outer contour of the orthographic projection of the insulating layer 103 on the substrate 101 and an outer contour of the orthographic projection of the conductive adhesive layer 102 on the substrate 101.

For example, as shown in FIG. 8, the insulating layer 103 is disposed in a central region of the conductive adhesive layer 102, and there is a space between all edges of the insulating layer 103 and the corresponding edges of the conductive adhesive layer 102. Or, as shown in FIG. 9, the insulating layer 103 is disposed at any one edge of the conductive adhesive layer 102, and there is a space between some edges of the insulating layer 103 and the corresponding edges of the conductive adhesive layer 102.

In this way, it can be ensured that a conductive path of the conductive adhesive layer 102 may not be blocked due to the presence of the insulating layer 103, thereby ensuring that the tape 100 still has a conductive performance and a good adhesion performance. As a result, the ESD resistance of the display panel 200 (i.e., the corresponding vehicle-mounted display module 1000) may be effectively improved; meanwhile, it may ensure that the tape 100 firmly bonds the display panel 200 and the plastic frame 300 together.

In some examples, as shown in FIG. 8, the tape 100 has a strip shape. A shape of the insulating layer 103 is set to match the shape of the tape 100, so the insulating layer 103 also has a strip shape. Optionally, a width of the insulating layer 103 ranges from 2 mm to 4 mm.

In addition, the arranging position of the insulating layer 103 on the conductive adhesive layer 102 can be selected and determined to match a position of the conducting part in the object to be bonded, which is not limited in some embodiments of the present disclosure.

In some embodiments of the present disclosure, as shown in FIG. 2, an orthographic projection of the conducting part 203 on the array substrate 201 is within an orthographic projection of the insulating layer 103 of the tape 100 on the array substrate 201. Optionally, the conducting part 203 directly faces the insulating layer 103 in the tape 100, and an area of an orthographic projection of the conducting part 203 on the array substrate 201 is less than an area of an orthographic projection of the insulating layer 103 in the tape 100 on the array substrate 201. In this way, in a case where the tape 100 is in direct contact with the conducting part 203, the insulating layer 103 is used to well insulate the conductive adhesive layer 103 from the conducting part 203, and the vehicle-mounted display module 1000 is prevented from a short circuit problem which is caused by the contact between the conductive adhesive layer 102 and the conducting part 203.

Figure 3:
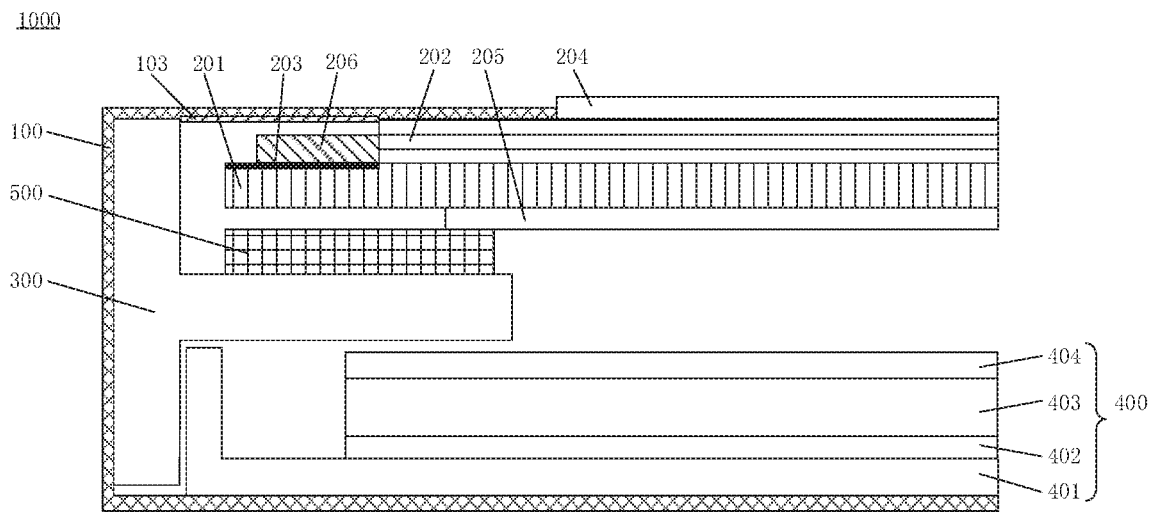
FIG. 3 is a schematic cross-sectional diagram of another vehicle-mounted display module in the B-B direction shown in FIG. 1.

In some other embodiments of the present disclosure, as shown in FIG. 3, the display panel 200 further includes: an overcoat 206 coating on the conducting part 203. That the overcoat 206 is disposed on the conducting part 203 can effectively protect a conductive performance of the conducting part 203 by using the overcoat 206, i.e., preventing the external factors from adversely affecting the conductive performance of the conducting part 203.

For example, the overcoat 206 is an ultraviolet ray (UV) adhesive layer or a room temperature vulcanized (RTV) silicon rubber layer.

In some examples, the conducting part 203 is signal lines. After the flexible printed circuit (FPC) is bonded to the corresponding signal lines by a hot pressing process, the conducting part 203 and the flexible printed board are coated with the UV adhesive layer, and the UV adhesive layer can be used to bond and fix the signal lines and the flexible printed circuit and protect the conductivity of the signal lines and the flexible printed circuit. Due to the limitations of production equipment and production processes, the overcoat 206 is difficult to completely cover the conducting part 203, that is, an edge of the conducting part 203 is not covered by the overcoat 206.

In some other examples, the conducting part 203 includes a plurality of line detection points. The line detection points are exposed, instead of being coated with the overcoat 206.

On this basis, an orthographic projection of a part of the conducting part 203 that is not covered by the overcoat 206 on the array substrate 201 is within the orthographic projection of the insulating layer 103 in the tape 100 on the array substrate 201. Optionally, the conducting part 203 faces the insulating layer 103 in the tape 100, and an area of an orthographic projection of the part of the conducting part 203 that is not covered by the overcoat 206 on the array substrate 201 is less than an area of an orthographic projection of the insulating layer 103 in the tape 100 on the array substrate 201. In this way, in a case where the tape 100 is in direct contact with the conducting part 203, the insulating layer 103 is used to well insulate the conductive adhesive layer 103 from the conducting part 203, and the vehicle-mounted display module 1000 is prevented from a short circuit problem which is caused by the contact between the conductive adhesive layer 102 and the conducting part 203.

The tape 100 is configured to bond the display panel 200 and the plastic frame 300 together to achieve lightness and thinness of the corresponding vehicle-mounted display module 1000. A thickness of the tape 100 is relatively small, and a thickness of the insulating layer 103 in the tape 100 can be selectively set according to actual needs.

On this basis, in some examples, the thickness of the insulating layer 103 ranges from 0.001 mm to 0.030 mm, for example, 0.025 mm. Herein, the thickness of the insulating layer 103 is a dimension thereof along a direction facing away from the conductive adhesive layer 102. In a case where the insulating layer 103 has a multi-layer structure, the thickness of the insulating layer 103 is the sum of thicknesses of layers that constitute it.

In some embodiments of the present disclosure, the display panel 200 further includes a first polarizer 204 disposed on a side of the color filter substrate 202 facing away from the array substrate 201. A part of the color filter substrate 202 that is not covered by the first polarizer 204 is bonded to the tape 100, and the thickness of the tape 100 is less than or equal to a thickness of the first polarizer 204. Herein, the thickness of the tape 100 and the thickness of the first polarizer 204 are their dimensions along a direction facing away from the color filter substrate 202 respectively.

That is, after the tape 100 is provided with the insulating layer 103, the thickness of the tape 100 should be less than or equal to the thickness of the first polarizer 204. In this way, after the display panel 200 is bonded to the plastic frame 300 by using the tape 100, since the tape 100 is bonded to the part of the color filter substrate 202 that is not covered by the first polarizer 204, a bearing surface of the plastic frame 300 configured to bear the display panel 200 is taken as a basis; an outer surface of the tape 100 is not higher than a surface of the first polarizer 204 facing away from the color filter substrate 202. It is convenient to install a glass cover plate and other accessories on the first polarizer 204 flatly.

In some embodiments of the present disclosure, with continued reference to FIG. 2, the display panel 200 further includes the second polarizer 205 disposed on a side of the array substrate 201 facing away from the color filter substrate 202. The vehicle-mounted display module 1000 further includes a foam 500 disposed between the second polarizer 205 and a bearing surface of the plastic frame 300.

Herein, the bearing surface of the plastic frame 300 refers to a surface of the plastic frame 300 configured to bear the display panel 200. That the foam 500 is disposed between the plastic frame 300 and the display panel 200 can support and protect the display panel 200 by utilizing the foam 500. For example, the foam 500 can effectively buffer the force received by the display panel 200 to prevent the display panel 200 from being damaged by pressure.

In some embodiments of the present disclosure, referring to FIG. 3, the vehicle-mounted display module 1000 further includes a back light module 400 disposed at a side of the plastic frame 300 facing away from the display panel 200. The tape 100 also bonds the back light module 400, so as to fix the back light module 400 and the display panel 200.

The back light module 400 is configured to provide backlight to the display panel 200. A light exit region of the back light module 400 is usually arranged corresponding to the display area AA of the display panel 200. A structure of the back light module 400 may be selectively set according to actual needs, which is not limited in some embodiments of the present disclosure.

In some examples, the back light module 400 includes a base 401; and a backlight source 402, a light guide plate 403 and an optical film group 404 that are stacked on the base 401. Optionally, the optical film group 404 includes at least one functional film, such as a diffusion sheet and a brightness enhancement sheet that are stacked.

Figure 5:
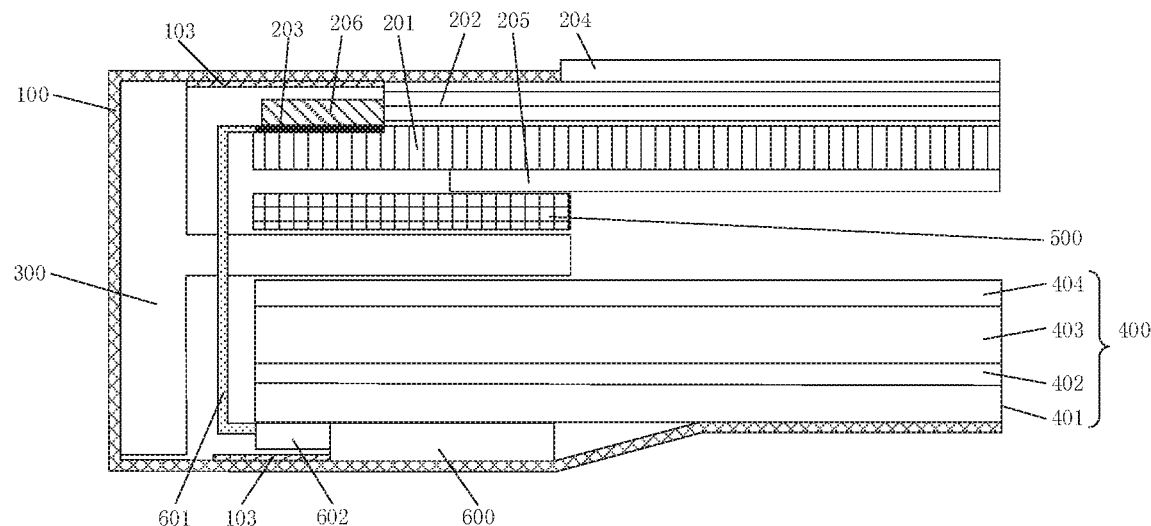
FIG. 5 is a schematic cross-sectional diagram of yet another vehicle-mounted display module in the B-B direction shown in FIG. 1.

In some embodiments, referring to FIG. 5, the vehicle-mounted display module 1000 further includes: a screen driving plate 600, a flexible printed circuit 601 electrically connected to the display panel 200, and a connector 602 electrically connected to the screen driving plate 600 and to the flexible printed circuit 601.

Herein, the screen driving plate 600 may also be referred to as a timing controller (T-con) plate. The screen driving plate 600 is disposed on a side of the back light module 400 facing away from the display panel 200, and is configured to provide the display panel 200 with signals, such as timing signals and data signals, required for display. For example, the screen driving plate 600 is a printed circuit board (PCB).

The flexible printed circuit 601 is electrically connected to the display panel 200, and is electrically connected to the conducting part 203 (for example, signal lines) in the display panel 200. After the flexible printed circuit 601 is bonded to the conducting part 203 in the display panel 200, the flexible printed circuit 601 is bent, so that an end of the flexible printed circuit 601 away from the conducting part 203 is electrically connected to the screen driving plate 600 through the connector 602.

The connector 602 is configured to connect the flexible printed circuit 601 and the screen driving plate 600, and a structure thereof may be selectively set according to actual needs, which is not limited in some embodiments of the present disclosure.

In some embodiments described above, the tape 100 also bonds the screen driving plate 600. That is, the tape 100 wraps the screen driving board 600 in a case where the tape 100 bonds the display panel 200, the plastic frame 300 and the back light module 400. An orthographic projection of the connector 602 on the tape 100 should be within a region where the insulating layer 103 in the tape 100 is located. That is, a part of the conductive adhesive layer 102 in the tape 100 facing the connector 602 is also provided with an insulating layer 103. In a case where the tape 100 and the connector 602 are in direct contact, the insulating layer 103 may well insulate the conductive adhesive layer 103 from the connector 602, thereby preventing the vehicle-mounted display module 1000 from a short circuit problem which is caused by the contact between the conductive adhesive layer 102 and the connector 602.

Figure 10:
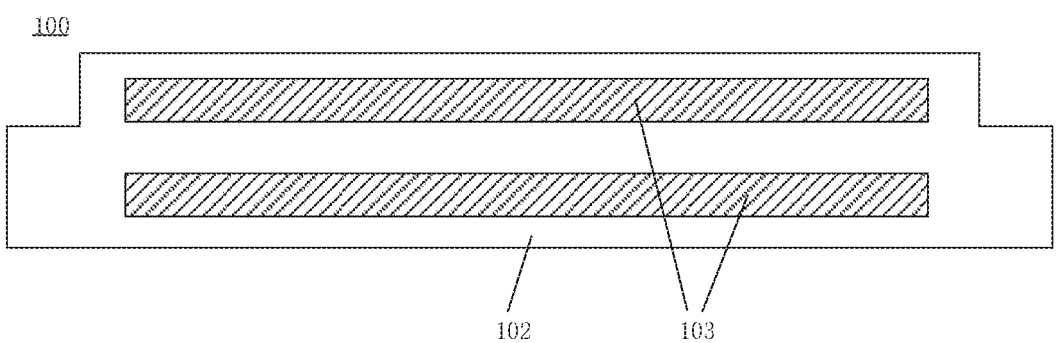
FIG. 10 is a schematic top view of another tape shown in FIG. 6.

It will be noted that, the insulating layer 103 corresponding to the connector 602 and the insulating layer 103 corresponding to the conducting part 203 may be the same insulating layer (for example, as shown in FIGS. 8 and 9), or two insulating layers that are independently arranged (for example, as shown in FIG. 10).

Figure 12:
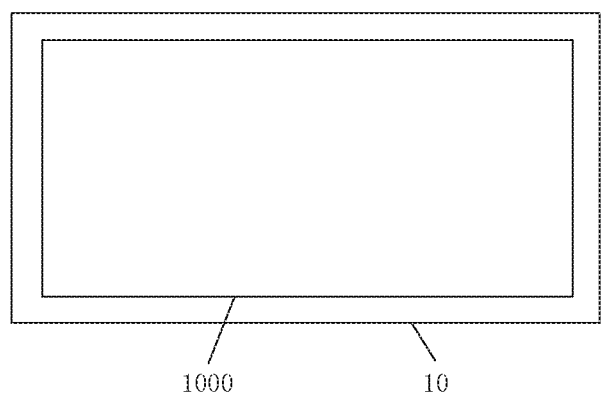
FIG. 12 is a schematic diagram of a vehicle-mounted display device, in accordance with some embodiments of the present disclosure.

Some embodiments of the present disclosure provide a vehicle-mounted display device. As shown in FIG. 12, the vehicle-mounted display device 10 includes the vehicle-mounted display module 1000 in the above embodiments, and has the same beneficial effects as the vehicle-mounted display module 1000 in the above embodiments. The structures and beneficial effects of the vehicle-mounted display device 1000 have been described in detail in the above embodiments, which is not described herein again.

In some examples, the vehicle-mounted display device 10 is a vehicle-mounted liquid crystal display device.

In the description of the above embodiments, specific features, structures, materials or characteristics may be combined in any suitable manner in any one or more embodiments or examples.

The forgoing descriptions are merely specific implementation manners of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A tape, comprising:
   a substrate;
   a conductive adhesive layer disposed on the substrate; and
   an insulating layer disposed on a part of a bonding surface of the conductive adhesive layer, wherein the insulating layer is configured to insulate the conductive adhesive layer from a conducting part of an object to be bonded;
   wherein the insulating layer has a multi-layer structure, and the insulating layer includes: at least one insulating resin layer stacked along a direction of the conductive adhesive layer facing away from the substrate, and an insulating adhesive layer located on a surface of the at least one insulating resin layer facing away from the substrate;
   wherein an orthographic projection of the insulating layer on the substrate is within an orthographic projection of the conductive adhesive layer on the substrate, and at least a part of an outer contour of the orthographic projection of the insulating layer on the substrate and an outer contour of the orthographic projection of the conductive adhesive layer on the substrate have a space therebetween, wherein the insulating layer is disposed in a central region of the conductive adhesive layer, and there is the space between all edges of the insulating layer and corresponding edges of the conductive adhesive layer;
   wherein the substrate is a light-shielding substrate, and the substrate is made of a material that is opaque or has a light transmittance less than or equal to 10%; or
   the conductive adhesive layer is a light-shielding conductive adhesive layer, and the conductive adhesive layer is made of conductive glue that is opaque or has a light transmittance less than or equal to 10%.

2. The tape according to claim 1, wherein a thickness of the insulating layer ranges from 0.001 mm to 0.030 mm, and the thickness of the insulating layer is a dimension thereof along a direction facing away from the conductive adhesive layer.

3. A vehicle-mounted display module, comprising:
   a display panel;
   a plastic frame bearing the display panel; and
   the tape bonding the display panel and the plastic frame according to claim 1.

4. The vehicle-mounted display module according to claim 3, wherein the display panel includes:
   an array substrate;
   a color filter substrate; and
   a conducting part located on a part of the array substrate that is not covered by the color filter substrate;
   wherein an orthographic projection of the conducting part on the array substrate is within an orthographic projection of the insulating layer in the tape on the array substrate.

5. The vehicle-mounted display module according to claim 3, wherein the display panel includes:
   an array substrate;
   a color filter substrate;
   a conducting part located on a part of the array substrate that is not covered by the color filter substrate; and
   an overcoat coating on the conducting part, and the overcoat is configured to protect a conductive performance of the conducting part;
   wherein an orthographic projection of a part of the conducting part that is not covered by the overcoat on the array substrate is within an orthographic projection of the insulating layer in the tape on the array substrate.

6. The vehicle-mounted display module according to claim 5, wherein the overcoat is an ultraviolet ray adhesive layer or a room temperature vulcanized silicone rubber layer.

7. The vehicle-mounted display module according to claim 4, wherein the conducting part includes signal lines or line detection points.

8. The vehicle-mounted display module according to claim 4, wherein the display panel further includes: a first polarizer disposed on a side of the color filter substrate facing away from the array substrate; and
   a part of the color filter substrate that is not covered by the first polarizer is bonded to the tape, and a thickness of the tape is less than or equal to a thickness of the first polarizer;
   wherein the thickness of the tape and the thickness of the first polarizer are their dimensions along a direction facing away from the color filter substrate respectively.

9. The vehicle-mounted display module according to claim 3, further comprising: a back light module disposed at a side of the plastic frame facing away from the display panel;
   wherein the tape further bonds the back light module.

10. The vehicle-mounted display module according to claim 3, further comprising:
  a screen driving plate;
  a flexible printed circuit electrically connected to the display panel;
  a connector electrically connected to the screen driving plate and the flexible printed circuit;
  wherein the tape bonds the screen driving plate, and an orthographic projection of the connector on the tape is within a region where the insulating layer in the tape is located.

11. A vehicle-mounted display device, comprising the vehicle-mounted display module according to claim 3.

12. The vehicle-mounted display module according to claim 5, wherein the conducting part includes signal lines or line detection points.

13. The vehicle-mounted display module according to claim 5, wherein the display panel further includes: a first polarizer disposed on a side of the color filter substrate facing away from the array substrate; and
  a part of the color filter substrate that is not covered by the first polarizer is bonded to the tape, and a thickness of the tape is less than or equal to a thickness of the first polarizer;
  wherein the thickness of the tape and the thickness of the first polarizer are their dimensions along a direction facing away from the color filter substrate respectively.

* * * * *